(12) United States Patent
Hanahan et al.

(10) Patent No.: US 7,141,893 B2
(45) Date of Patent: Nov. 28, 2006

(54) HIGHLY AVAILABLE POWER DISTRIBUTION SYSTEM

(75) Inventors: Bruce A. Hanahan, Marlborough, MA (US); Mark S. Lanus, Tempe, AZ (US); Edward P. Sayre, Maynard, MA (US)

(73) Assignee: Motorola, Inc., Schaumburg, IL (US)

( * ) Notice: Subject to any disclaimer, the term of this patent is extended or adjusted under 35 U.S.C. 154(b) by 21 days.

(21) Appl. No.: 11/093,854

(22) Filed: Mar. 30, 2005

(65) Prior Publication Data

US 2006/0220464 A1    Oct. 5, 2006

(51) Int. Cl.
*H02J 7/00* (2006.01)
*H02J 9/00* (2006.01)

(52) U.S. Cl. .............................. 307/64; 307/65; 307/66

(58) Field of Classification Search .................. 307/64, 307/65, 66
See application file for complete search history.

(56) References Cited

U.S. PATENT DOCUMENTS

| | | | | |
|---|---|---|---|---|
| 4,983,856 A | * | 1/1991 | Pelletier | 307/20 |
| 5,726,506 A | * | 3/1998 | Wood | 307/147 |
| 6,006,341 A | * | 12/1999 | Kaminski | 714/3 |
| 6,282,599 B1 | * | 8/2001 | Gallick et al. | 710/306 |
| 6,563,706 B1 | * | 5/2003 | Strickler | 361/695 |
| 6,662,254 B1 | * | 12/2003 | Tal et al. | 710/300 |
| 6,757,774 B1 | * | 6/2004 | Benson et al. | 710/305 |
| 6,795,885 B1 | * | 9/2004 | deBlanc et al. | 710/305 |
| 6,833,634 B1 | * | 12/2004 | Price | 307/18 |
| 7,010,715 B1 | * | 3/2006 | Barbas et al. | 714/4 |

* cited by examiner

*Primary Examiner*—Lynn Feild
*Assistant Examiner*—Michael Rutland-Wallis
(74) *Attorney, Agent, or Firm*—Kevin D. Wills

(57) ABSTRACT

A power distribution system and method may include a first power domain having a first plurality of power rails, a second power domain having a second plurality of power rails, where the first power domain is electrically independent of the second power domain, and a plurality of modules coupled to the first power domain and the second power domain, where each of the plurality of modules is coupled to a unique set of one of the first plurality of power rails and one of the second plurality of power rails. The system may also include a plurality of mated pairs, where each of the plurality of modules is in only one of the plurality of mated pairs, where each of the plurality of mated pairs is coupled to four separate of the first and second plurality of power rails, and where each of the plurality of mated pairs is coupled to a unique set of the first plurality of power rails and the second plurality of power rails.

18 Claims, 4 Drawing Sheets

HIGHLY AVAILABLE POWER DISTRIBUTION SYSTEM

BACKGROUND OF INVENTION

Although an embedded computer system may include redundant cards such that the failure of one card will not cause overall system downtime, power outages can cause an entire chassis or shelf to fail. In the prior art, when one card catastrophically fails, its redundant counterpart is often on the same set of power rails, which can lead to both cards failing. This catastrophic power failure can also lead to other cards failing in the embedded computer system.

There is a need, not met in the prior art, to protect redundant pairs of cards from catastrophic power failure. Accordingly, there is a significant need for an apparatus and method that overcomes the deficiencies of the prior art outlined above.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any system for power distribution. Certain representative implementations may include, for example AC power distribution, DC power distribution, and power distribution in an embedded computer chassis or system of multiple chassis.

A detailed description of an exemplary application is provided as a specific enabling disclosure that may be generalized to any application of the disclosed system, device and method for distribution of power in accordance with various embodiments of the present invention.

Figure 1:
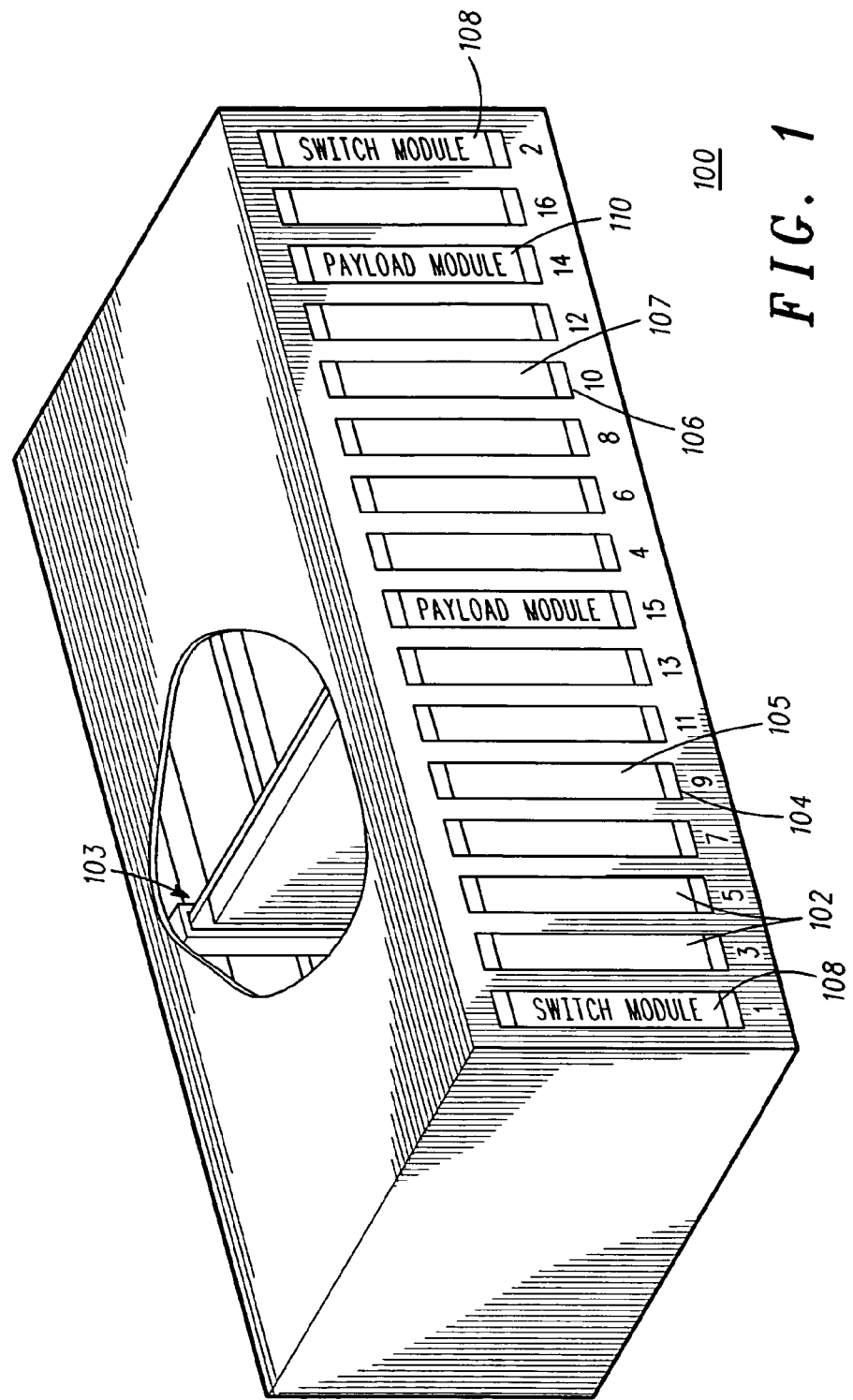
FIG. 1 representatively illustrates an embedded computer chassis in accordance with an exemplary embodiment of the present invention.

FIG. 1 representatively illustrates an embedded computer chassis in accordance with an exemplary embodiment of the present invention. As shown in FIG. 1, embedded computer chassis 100 may include a backplane 103, with software and a plurality of slots 102 for inserting modules, for example, switch modules 108 and payload modules 110. Backplane 103 may be used for coupling modules placed in plurality of slots 102 and power distribution.

As shown in FIG. 1, embedded computer chassis 100 may comprise at least one switch module 108 coupled to any number of payload modules 110 via backplane 103. Backplane 103 may accommodate any combination of a packet switched backplane including a distributed switched fabric or a multi-drop bus type backplane. Bussed backplanes may include VME, CompactPCI, and the like. Payload modules 110 may add functionality to embedded computer chassis 100 through the addition of processors, memory, storage devices, I/O elements, and the like. In other words, payload module 110 may include any combination of processors, memory, storage devices, I/O elements, and the like, to give embedded computer chassis 100 any functionality desired by a user. In the embodiment shown, there are sixteen slots 102 to accommodate any combination of switch modules 108 and payload modules 110. However, an embedded computer chassis 100 with any number of slots may be included in the scope of the invention.

In an embodiment, embedded computer chassis 100 can use switch module 108 as a central switching hub with any number of payload modules 110 coupled to switch module 108. Embedded computer chassis 100 may support a point-to-point, switched input/output (I/O) fabric. Embedded computer chassis 100 may include both node-to-node (for example computer systems that support I/O node add-in slots) and chassis-to-chassis environments (for example interconnecting computers, external storage systems, external Local Area Network (LAN) and Wide Area Network (WAN) access devices in a data-center environment). Embedded computer chassis 100 may be implemented by using one or more of a plurality of switched fabric network standards, for example and without limitation, InfiniBand™, Serial RapidIO™, Ethernet™, AdvancedTCA™, PCI Express™, and the like. Embedded computer chassis 100 is not limited to the use of these switched fabric network standards and the use of any switched fabric network standard is within the scope of the invention.

In one embodiment, backplane 103 can be an embedded packet switched backplane as is known in the art. In another embodiment, backplane 103 can be an overlay packet switched backplane that is overlaid on top of a backplane that does not have packet switched capability. In any embodiment of the invention, switch module 108 may communicate with payload modules 110 via a plurality of links, for example and without limitation, 100-ohm differential signaling pairs.

In an embodiment, embedded computer chassis 100 and backplane 103 can use the CompactPCI (CPCI) Serial Mesh Backplane (CSMB) standard as set forth in PCI Industrial Computer Manufacturers Group (PICMG®) specification 2.20, promulgated by PICMG, 301 Edgewater Place, Suite 220, Wakefield, Mass. CSMB provides infrastructure for applications such as Ethernet, Serial RapidIO, other proprietary or consortium based transport protocols, and the like. In another embodiment embedded computer chassis 100 can use an Advanced Telecom and Computing Architecture (ATCA™) standard as set forth by PICMG. The embodiment of the invention is not limited to the use of these standards, and the use of other standards is within the scope of the invention.

Embedded computer chassis 100 can include multiple power domains coupled to provide power, via backplane 103, to switch modules 108 and payload modules 110. Power domains can supply for example and without limitation, DC voltage to backplane 103 along any number of power rails, bus bars, or conductors. Switch modules 108 and payload modules 110 may be coupled to the power rails on the backplane 103. Multiple power domains may be independent of each other so as to provide independent and redundant power to backplane 103. In other words, multiple power domains may be electrically isolated so as to provide power redundancy to embedded computer chassis 100.

In an embodiment, embedded computer chassis 100 may provide redundancy in the slot configuration by providing that each slot 104 has a corresponding slot 106 such that module 105 in slot 104 has a corresponding module 107 in corresponding slot 106. In an embodiment, module 105 and corresponding module 107 may provide the same function to embedded computer chassis 100 such that module 105 and corresponding module 107 are redundant in embedded computer chassis 100. For example, if module 105 were to cease to function, corresponding module 107 may assume the functions of module 105 without interruption of service. This redundancy may hold for both switch modules and payload modules and provides embedded computer chassis 100 with greater reliability.

In the embodiment shown, slot 1 and slot 2, which may but do not need to correspond to a physical adjacency, may contain switch modules 108 such that the switch modules perform redundant functions. In this embodiment, slot 1 corresponds to slot 2 and the switch module in slot 1 corresponds to the switch module in slot 2. In another embodiment, slot 13 and slot 14, which may but do not need to correspond to a physical adjacency, may contain payload modules 110 such that the payload modules perform redundant functions. In this embodiment, slot 13 corresponds to slot 14 and the payload module in slot 13 corresponds to the payload module in slot 14.

In the embodiment depicted in FIG. 1, slot 1 and corresponding slot 2 are at opposite ends of embedded computer chassis 100 and may be identified by their logical implementation. This separation may be to ensure maximum separation distance between switch modules 108 for increased reliability in case of the failure of one switch module. Other mated pairs of slots may be separated by substantially a half-length of embedded computer chassis 100. For example, logical slot 3 may correspond with logical slot 4 such that slot 3 and corresponding slot 4 are separated by substantially a half-length of embedded computer chassis 100. In another illustrative example, logical slot 9 may correspond with logical slot 10 such that slot 9 and corresponding slot 10 are separated by substantially a half-length of embedded computer chassis 100. The slot locations depicted in FIG. 1 are not limiting of the invention. Other slot configurations that separate slots and corresponding slots by more or less than a half-length of embedded computer chassis are within the scope of the invention.

The number of slots 102 depicted in embedded computer chassis 100 is illustrative and not limiting of the invention. The logical and physical slot designations may be defined by one skilled in the art. Embedded computer chassis 100 may have any number of slots and modules and be within the scope of the invention.

Figure 2:
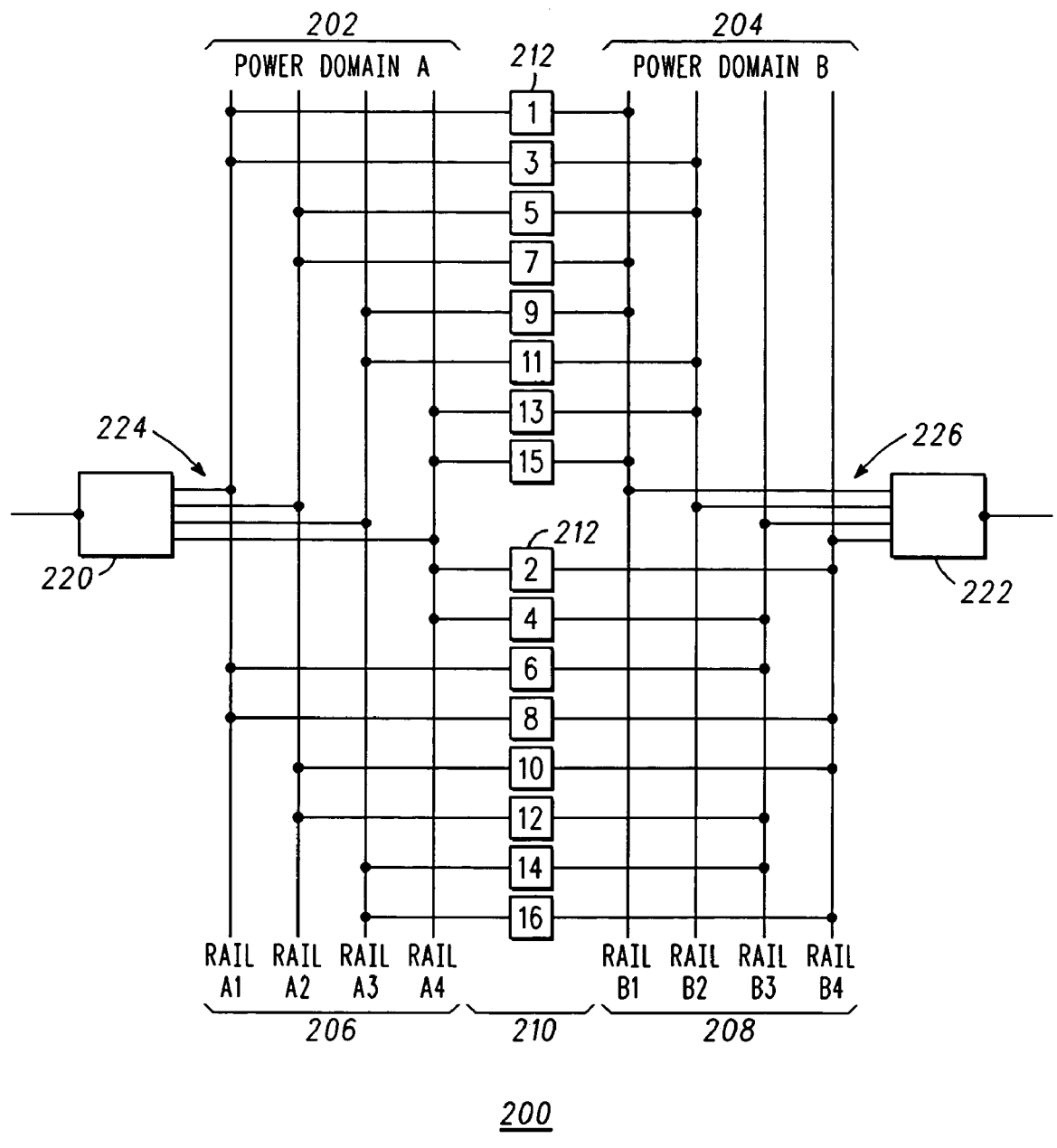
FIG. 2 representatively illustrates a block diagram of a power distribution system in accordance with an exemplary embodiment of the present invention.

FIG. 2 representatively illustrates a block diagram of a power distribution system 200 in accordance with an exemplary embodiment of the present invention. In an embodiment, power distribution system 200 may be implemented in embedded computer chassis 100, but this is not limiting of the invention. Power distribution system 200 may be implemented in other environments and be within the scope of the invention.

As shown in FIG. 2, power distribution system 200 may include a first power domain 202 having a first power entry module 220 and a second power domain 204 having a second power entry module 222. First power domain 202 may include a first plurality of power rails 206, while second power domain 204 may include a second plurality of power rails 208.

First and second power entry modules may function to filter and monitor power entering embedded computer chassis 100 and distribute power to its associated power rails. In an exemplary embodiment, first power entry module 220 and second power entry module 222 may function to filter 100 amps, −48V DC power and distribute to first plurality of power rails 206 and second plurality of power rails 208 respectively. Distribution to first plurality of power rails 206 may occur over first set of feed lines 224. Distribution to second plurality of power rails 208 may occur over second set of feed lines 226.

First power domain 202 and second power domain 204 may be independent of each other so as to provide power independently and redundantly to power distribution system 200. In other words, first power domain 202 and second power domain 204 may be electrically isolated so as to provide power redundancy to power distribution system 200.

In an embodiment, first power domain 202 and second power domain 204 may be coupled to plurality of modules 210. In an embodiment, plurality of modules 210 may be switch modules 108, payload modules 110, and the like, as discussed with reference to FIG. 1. In an embodiment, plurality of modules 210 may also belong to plurality of mated pairs 212, where each of the plurality of modules 210 is in only one of the plurality of mated pairs 212. For example, one of plurality of mated pairs 212 may include module 1 and module 2. Another one of plurality of mated pairs 212 may include module 3 and module 4, and so on. In the block diagram embodiment a power distribution system 200 shown in FIG. 2, the upper set of plurality of modules (1, 3, 5, . . . ) corresponds to one of the lower set of plurality of power modules (2, 4, 6, . . . ) to form plurality of mated pairs 212. This is not limiting of the invention as other schematic combinations of modules may form plurality of mated pairs 212 and be within the scope of the invention.

In an embodiment, a module and its corresponding module may provide the same function to embedded computer chassis such that the module and its corresponding module are redundant. For example, if module 1 were to cease to function, corresponding module 2 may assume the functions of module 1 without interruption of service. The module designations of FIG. 2 may be mapped to the slot designations of the system.

In the embodiment shown, each power domain may include four power rails. First power domain 202 includes four power rails (A1, A2, A3 and A4), while second power domain 204 includes four power rails (B1, B2, B3 and B4). Each power rail may supply power to a one or more of plurality of modules 210. For example and not limiting of the invention, if 100 amps of current is being fed to each power entry module, then each power rail can supply 25 amps to each connected module.

In an embodiment, power distribution system 200 is coupled to provide a redundant, reliable source of power to each of the plurality of modules 210. To provide this redundancy, each module may be coupled to one power rail from each of the first power domain 202 and the second power domain 204. If one or more of first plurality of power rails 206 in the first power domain 202 or one or more of second plurality of power rails 208 in the second power domain 204 fail, the module will still be able to draw power from the remaining power domain. For example, module 1 is coupled to power rail A1 from first plurality of power rails 206 in first power domain 202 and power rail B1 from second plurality of power rails 208 in second power domain 204.

In some circumstances, failure of one of the plurality of modules may cause one or both of the power rails coupled to that module to fail. This can have the effect of cutting off power supplied to other modules as well. In some instances, power to both modules in a mated pair can be faulted, thereby causing the functionality of that mated pair to be removed from the system and potentially causing unacceptable system downtime. In order to maximize reliability and minimize the chances for such failures to occur, an embodiment of the invention interleaves the coupling of power rails to plurality of modules 210. Interleaving power rail couplings to plurality of modules 210 allows for a module to fail and disable both of its coupled power rails, while all of the remaining plurality of modules 210 still receive power from at least one remaining power rail. In an embodiment, the module-centric power fault that causes two power rails to fail will not result in the power failure on a second module.

In an embodiment, power rails can be interleaved to plurality of slots 102 via the backplane 103 in an embedded computer chassis 100 so as to provide maximum reliability while supplying redundant power to each of plurality of modules 210 coupled to each of plurality of slots 102. However, this is not limiting of the scope of the invention, as power distribution system 200 may be applied in other environments and using other delivery mechanisms besides a backplane and still be within the scope of the invention.

In an embodiment, interleaving power rails on each of first power domain 202 and second power domain 204 may follow one or more guidelines so as to maximize reliability and minimize the chance that a module-centric failure will disable other modules in the system.

In an embodiment, one guideline for interleaving power rails is that each of the plurality of modules is coupled to a unique set of one of the first plurality of power rails 206 and one of the second plurality of power rails 208. In an exemplary embodiment, each of the plurality of modules 210 may be coupled to a unique 2-tuple of one of the first plurality of power rails 206 and one of the second plurality of power rails 208. This ensures that no two modules are coupled to the same set of first plurality of power rails and second plurality of power rails. In an exemplary embodiment, no two modules are coupled to the same 2-tuple of first plurality of power rails 206 and second plurality of power rails 208. If one module fails, disabling both of its power rails, all other modules will have at least one power rail to provide power. This is depicted in FIG. 2 as no two of the plurality of modules 210 is coupled to the same set, for example the same 2-tuple, of first plurality of power rails 206 and second plurality of power rails 208. For a sixteen-module system, it is implicit that no power rail supports more than four modules.

Table 1 illustrates that the mapping of power rails to modules depicted in FIG. 2 meets the criteria of the guideline above in that all sixteen combinations of 2-tuples of power rails <1,1>, <1,2>, ..., <4,4> are accounted for in the sixteen entries of the table, where PR-A and PR-B refer to first plurality of power rails (A1 ... A4) and second plurality of power rails (B1 ... B4) respectively, and LS-A and LS-B refer to the logical slot/module A (the upper half of plurality of modules) and logical slot/module B of the mated pair (the lower half of plurality of modules) respectively.

TABLE 1

Mapping of Power Rails to Mated Slots (logical slot orientation)

| Power Rails LS-A <PR-A, PR-B> | Mated Slots <LS-A, LS-B> | Power Rails LS-B <PR-A, PR-B> |
| --- | --- | --- |
| <1, 1> | <1, 2> | <4, 4> |
| <1, 2> | <3, 4> | <4, 3> |
| <2, 2> | <5, 6> | <1, 3> |
| <2, 1> | <7, 8> | <1, 4> |
| <3, 1> | <9, 10> | <2, 4> |
| <3, 2> | <11, 12> | <2, 3> |
| <4, 2> | <13, 14> | <3, 3> |
| <4, 1> | <15, 16> | <3, 4> |

In an embodiment, another guideline for interleaving power rails is that each of the plurality of mated pairs 212 is coupled to four separate of the first plurality of power rails 206 and second plurality of power rails 208. For example, each of the plurality of mated pairs 212 may be coupled to a 2-tuple of 2-element sets where the first 2-element set may include two distinct power rails from the first plurality of power rails 206 and the second 2-element set may include two distinct power rails from the second plurality of power rails 208. This ensures that each of the plurality of mated pairs 212 is coupled to four distinct power rails and that no module in a mated pair is coupled to the same power rail in either first plurality of power rails 206 or second plurality of power rails 208. For example, each of the plurality of mated pairs 212 is coupled to a distinct 2-tuple of 2-element sets where the first set may include two distinct power rails from the first plurality of power rails 206 and the second 2-element set may include two power rails from the second plurality of power rails 208. This ensures that it requires the failure of two pairs of power rails, two each from both first plurality of power rails 206 and second plurality of power rails 208 to cause one of the plurality of mated pairs to fail.

Table 2 illustrates compliance with the above guideline. Table 1 may be modified to Table 2 by changing the outermost columns to show the 2-tuple of power rails on each power domain for the mated pairs. Table 2 shows that each of the plurality of mated pairs 212 use four separate and distinct power rails in that no mated pair has a 2-tuple for either power domain with two identical rails <PR-N, PR-N>.

TABLE 2

Mapping of Power Rails to Mated Slots (power domain orientation)

| Power Rails Domain A <PR-A(LS-A), PR-A(LS-B)> | Mated Slots <LS-A, LS-B> | Power Rails Domain B <PR-B(LS-A), PR-B(LS-B)> |
|---|---|---|
| <1, 4> | <1, 2> | <1, 4> |
| <1, 4> | <3, 4> | <2, 3> |
| <2, 1> | <5, 6> | <2, 3> |
| <2, 1> | <7, 8> | <1, 4> |
| <3, 2> | <9, 10> | <1, 4> |
| <3, 2> | <11, 12> | <2, 3> |
| <4, 3> | <13, 14> | <2, 3> |
| <4, 3> | <15, 16> | <1, 4> |

In an embodiment, yet another guideline for interleaving power rails is that each of the plurality of mated pairs 212 is coupled to a unique set of the first plurality of power rails 206 and the second plurality of power rails 208. For example, each of the plurality of mated pairs 212 is coupled to a unique 2-tuple of 2-element sets where the first 2-element set may include two distinct power rails from the first plurality of power rails 206 and the second 2-element set may include two distinct power rails from the second plurality of power rails 208. This ensures that no two of the plurality of mated pairs 212 are coupled to the same four power rails and that the failure of two pairs of power rails, two each from both first plurality of power rails 206 and second plurality of power rails 208 causes at most one of the plurality of mated pairs 212 to fail. These last two guideline are depicted in FIG. 2 as no two of the plurality of mated pairs 212 is coupled to the same set of the first plurality of power rails 206 and second plurality of power rails 208.

By changing the tuples in Table 2 to set notation, Table 3 illustrates compliance with the above guideline as no two of plurality of mated pairs 212 use the same four power rails. Looking at all of plurality of mated pairs 212 using the same set of power rails in first power domain (A) 202, it is easy to verify that each of plurality of mated pairs 212 have a different set of power rails in second power domain (B) 204.

TABLE 3

Mapping of Power Rails to Mated Slots (set notation)

| Power Rails Domain A {PR-A1, PR-A2} | Mated Slots <LS-A, LS-B> | Power Rails Domain B {PR-B1, PR-B2} |
|---|---|---|
| {1, 4} | <1, 2> | {1, 4} |
| {1, 4} | <3, 4> | {2, 3} |
| {1, 2} | <5, 6> | {2, 3} |
| {1, 2} | <7, 8> | {1, 4} |
| {2, 3} | <9, 10> | {1, 4} |
| {2, 3} | <11, 12> | {2, 3 |
| {3, 4} | <13, 14> | {2, 3} |
| {3, 4} | <15, 16> | {1, 4} |

Although power distribution system 200 depicts 16 modules and four power rails in each power domain, this is not limiting of the invention. Any number of modules and power rails is within the scope of the invention. For example, in an embodiment, the number of power rails used in each of first power domain 202 and second power domain 204 to meet the above guidelines may be calculated as:

$$N = \text{Roundup}(\text{sqrt}(\text{Number of slots}))$$

where N=number of power rails in a power domain.
Roundup( )=round up to the next highest integer
Sqrt( )=square root To illustrate, a power distribution system with sixteen (16) slots/modules requires four (4) power rails in each power domain. For 5–9 slots/modules, three (3) power rails are required, 11–16 slots/modules, four (4) power rails are required, 17–25 slots/modules, five (5) power rails are required, and for 26–36 slots/modules, six (6) power rails are required in each power domain, etc.

Figure 3:
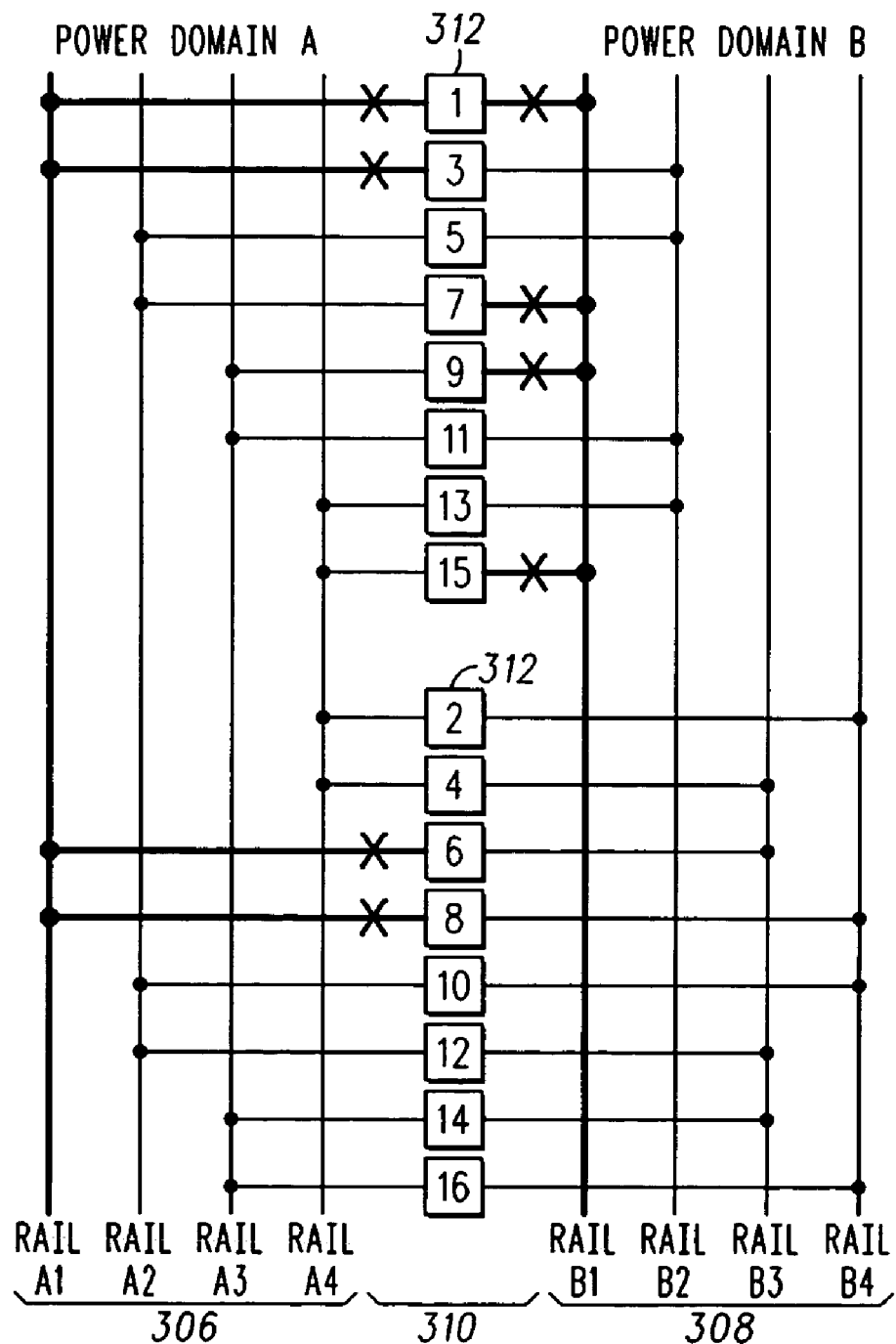
FIG. 3 representatively illustrates a block diagram of a power distribution system in accordance with another exemplary embodiment of the present invention.

FIG. 3 representatively illustrates a block diagram of a power distribution system 300 in accordance with another exemplary embodiment of the present invention. The embodiment, depicted in FIG. 3, is the same power distribution system depicted in FIG. 2 with one of the plurality of modules 310 (module 1) illustrated as faulted in such a way as to cause both power rails it is coupled to, to fail as well (the X's and bold lines indicate which power rails and connections have failed). In this embodiment, the failure of module 1 has disabled the two power rails coupled to module 1, so that other modules coupled to these failed power rails cannot receive power from the faulted power rails. As shown, one power rail from each of first plurality of power rails 306 and second plurality of power rails 308 is disabled. The failure of module 1 only disables module 1, as no other modules in plurality of modules 310 are disabled.

The power failure illustrated in FIG. 3, faults eight power connections, two on failed module 1 and six on modules that are now running in simplex (single power supply) power distribution mode (no redundancy). Also, as shown, the failure of module 1 does not disable the mated pair 312, as module 2 is still operational in duplex mode (power redundancy). In sum, the resulting configuration of power distribution system 300 is six slots/modules running in simplex power distribution mode, nine slots/modules running in duplex power distribution mode and one failed slot/module as a result of the dual power rail failure.

The following analysis illustrates the robustness of the interleaved power distribution system depicted in FIG. 2 and FIG. 3. FIG. 3 depicts a system with slots supplied in both simplex and duplex modes after the first power fault. A second and additional failure can be depicted in two additional cases for rail failure. For the case of slots in simplex mode a module failure occurs on a module that is already running on a single supply mode after the first dual power rail failure. The dependant probability for this occurrence is the probability of the original power rail fault ($1/16$) multiplied by the probability of the additional fault ($6/15$). The end result of these two failures is two failed power rails in one power domain, one failed power rail in the other power domain, and two modules/slots cutoff from both power domains. By the redundancy of the system no additional cards will be disabled via the power faults, and thus a probability of zero that the system will loose both redundant cards of a pair.

In the duplex mode case, module failure occurs on a module/slot that is still in duplex power distribution mode after the first failure. The dependent probability for this occurrence is the probability of the original power rail fault ($1/16$) multiplied by the probability of the additional power rail fault ($9/15$). The worst-case end result of these two failures is two failed power rails in each power domain and four modules/slots cutoff from both power domains. Since only one of the nine cases causes a mated pair to fail due to the power rail fault, the probability of losing one of the plurality of mated pairs 312 is $\frac{1}{9}$ or 0.11.

Therefore, the first module/slot failure that takes out two power rails causes one blade to fail. Given that the first failure occurred, the second dual power rail failure causes $(6/15)*1+(9/15)*[(8/9)*2+(1/9)*3]=1.67$ modules/slots to fail. Given that the first failure occurred, the expected number of plurality of mated pairs 312 lost due to the second dual power rail failure is $(6/15)*0+(9/15)*(1/9)=0.067$. Therefore, the dependent probability that a dual power rail failure results in losing one of the plurality of mated pairs 312 is $(1/16)*0.067=0.00417$. This indicates an extremely robust power distribution system in the unlikely event of two dual power rail failures.

Figure 4:
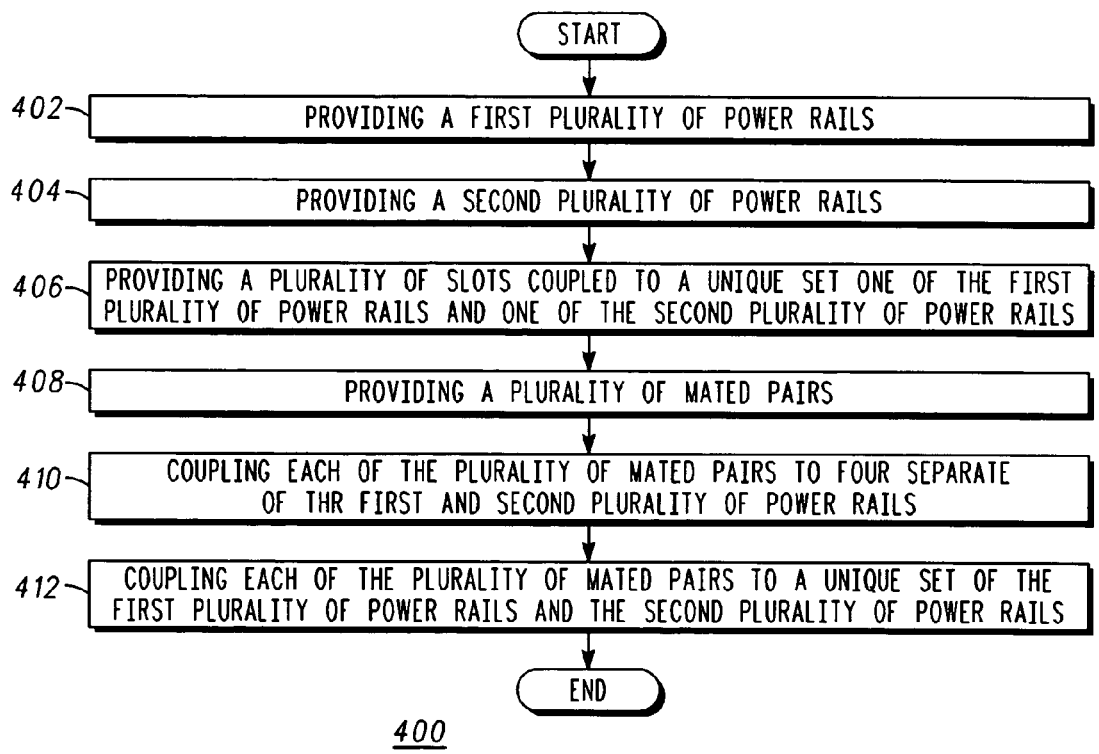
FIG. 4 representatively illustrates a flow diagram in accordance with an exemplary embodiment of the present invention.

FIG. 4 representatively illustrates a flow diagram in accordance with an exemplary embodiment of the present invention. Step 402, provides a first plurality of power rails residing substantially in the backplane. In an embodiment, the backplane may reside in an embedded computer chassis. Step 404 provides a second plurality of power rails residing substantially in the backplane, where the first plurality of power rails is electrically independent of the second plurality of power rails.

Step 406 provides a plurality of slots coupled to a unique set of one of the first plurality of power rails and one of the second plurality of power rails, while step 408 provides a plurality of mated pairs, where each of the plurality of slots is in only one of the plurality of mated pairs.

In step 410, each of the plurality of mated pairs is coupled to four separate of the first and second plurality of power rails. In step 412, each of the plurality of mated pairs is coupled to a unique set of the first plurality of power rails and the second plurality of power rails.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. A power distribution system, comprising:
   a first power domain having a first plurality of power rails;
   a second power domain having a second plurality of power rails, wherein the first power domain is electrically independent of the second power domain;
   a plurality of modules coupled to the first power domain and the second power domain, wherein each of the plurality of modules is coupled to a unique set of one of the first plurality of power rails and one of the second plurality of power rails; and
   a plurality of mated pairs, wherein each of the plurality of modules is in only one of the plurality of mated pairs, wherein each of the plurality of mated pairs is coupled to four separate of the first and second plurality of power rails, and wherein each of the plurality of mated pairs is coupled to a unique set of the first plurality of power rails and the second plurality of power rails.

2. The power distribution system of claim 1, wherein a module in a mated pair is operationally redundant with a corresponding module in the mated pair.

3. The power distribution system of claim 2, wherein the module and the corresponding module are at least one of a payload module and a switch module.

4. The power distribution system of claim 1, wherein the plurality of modules are one of ATCA and CPCI modules.

5. The power distribution system of claim 1, wherein the first and second plurality of power rails reside substantially in a backplane.

6. The power distribution system of claim 1, wherein the first and second plurality of power rails have a DC voltage.

7. An embedded computer chassis having a backplane, the embedded computer chassis comprising:
   a first plurality of power rails residing substantially in the backplane;
   a second plurality of power rails residing substantially in the backplane, wherein the first plurality of power rails is electrically independent of the second plurality of power rails;
   a plurality of slots coupled to a unique set of one of the first plurality of power rails and one of the second plurality of power rails; and
   a plurality of mated pairs, wherein each of the plurality of slots is in only one of the plurality of mated pairs, wherein each of the plurality of mated pairs is coupled to four separate of the first and second plurality of power rails, and wherein each of the plurality of mated pairs is coupled to a unique set of the first plurality of power rails and the second plurality of power rails.

8. The embedded computer chassis of claim 7, wherein each of the plurality of slots is coupled to receive a module.

9. The embedded computer chassis of claim 7, wherein each of the plurality of slots in a mated pair is coupled to receive a module which is operationally redundant with a corresponding module coupled to the mated pair.

10. The embedded computer chassis of claim 9, wherein the module and the corresponding module are at least one of a payload module and a switch module.

11. The embedded computer chassis of claim 7, wherein the embedded computer chassis is one of an ATCA and CPCI embedded computer chassis.

12. The embedded computer chassis of claim 7, wherein the first and second plurality of power rails have a DC voltage.

13. A method of distributing power in an embedded computer chassis, comprising:
   providing a first plurality of power rails residing substantially in a backplane;
   providing a second plurality of power rails residing substantially in the backplane, wherein the first plurality of power rails is electrically independent of the second plurality of power rails;
   providing a plurality of slots coupled to a unique set of one of the first plurality of power rails and one of the second plurality of power rails;
   providing a plurality of mated pairs, wherein each of the plurality of slots is in only one of the plurality of mated pairs;
   coupling each of the plurality of mated pairs to four separate of the first and second plurality of power rails; and
   coupling each of the plurality of mated pairs to a unique set of the first plurality of power rails and the second plurality of power rails.

14. The method of claim 13, wherein each of the plurality of slots is coupled to receive a module.

15. The method of claim 13, further comprising coupling each of the plurality of slots in a mated pair to receive a module which is operationally redundant with a corresponding module coupled to the mated pair.

16. The method of claim 15, wherein the module and the corresponding module are at least one of a payload module and a switch module.

17. The method of claim 13, wherein the embedded computer chassis is one of an ATCA and CPCI embedded computer chassis.

18. The method of claim 13, further comprising the first and second plurality of power rails having a DC voltage.

* * * * *